Patented May 15, 1934

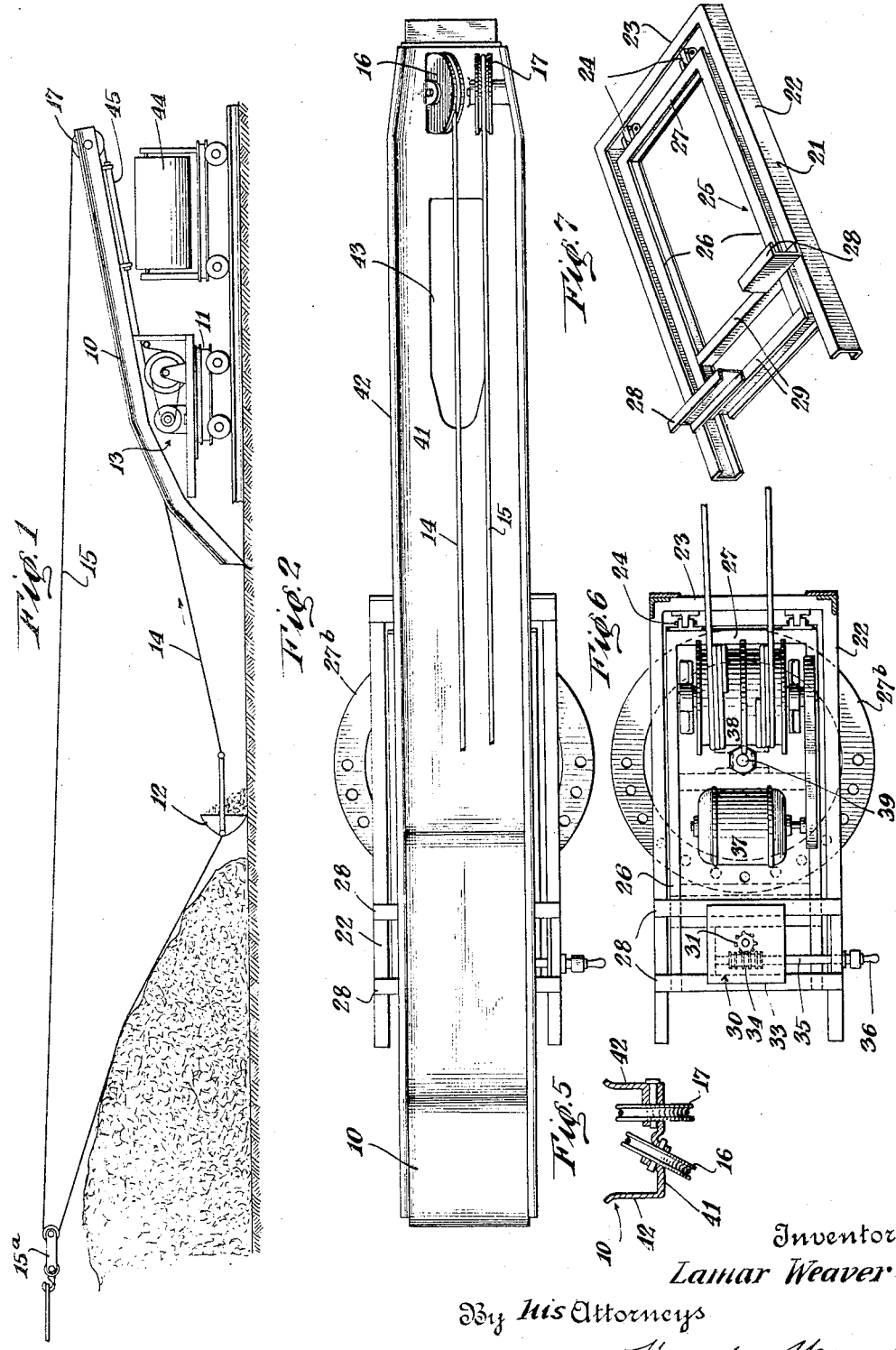

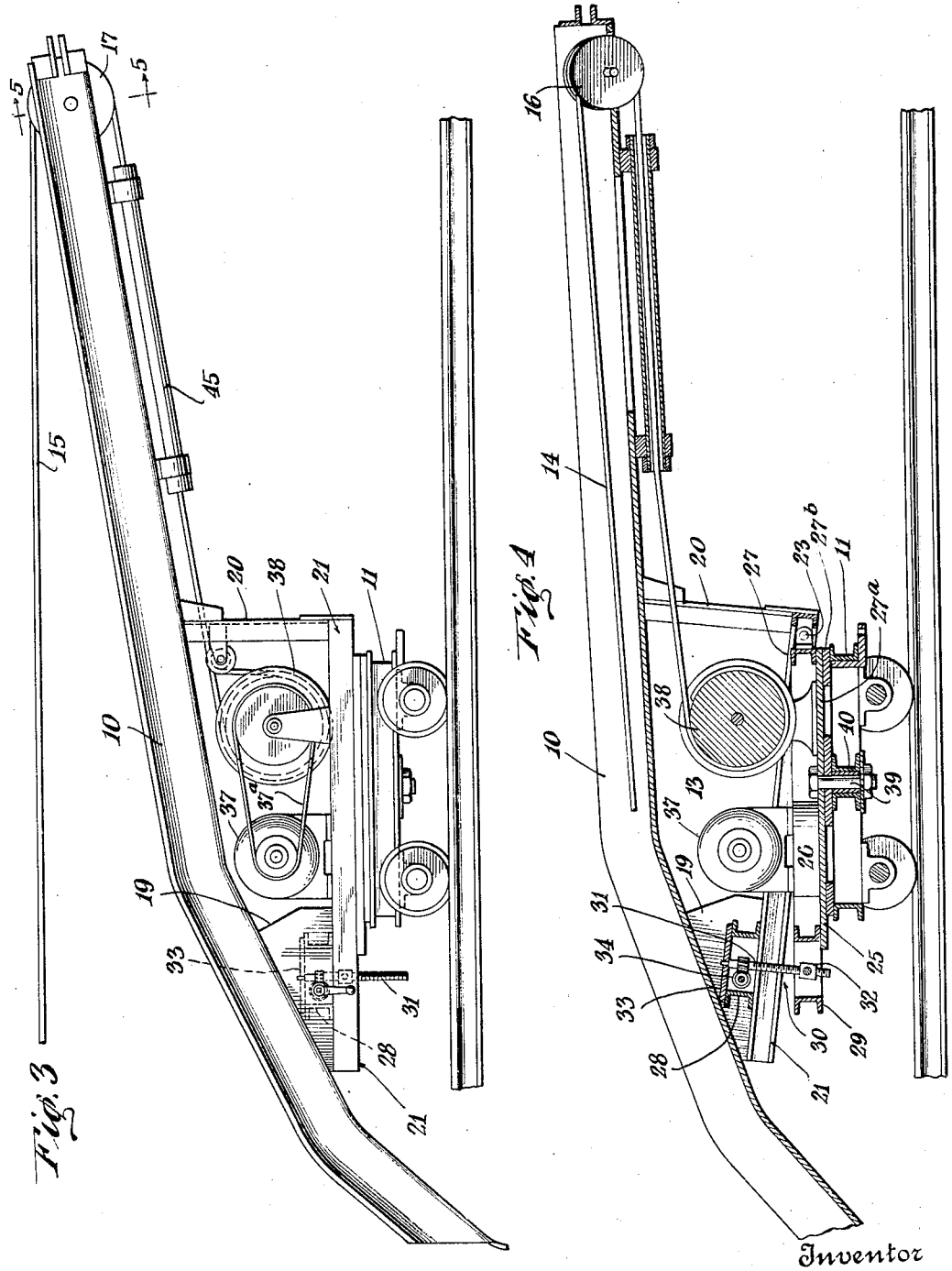

1,958,874

UNITED STATES PATENT OFFICE 1,958,874

SCRAPER-LOADER

Lamar Weaver, Ducktown, Tenn., assignor to Tennessee Copper Company, a corporation of New Jersey Application April 1, 1931, Serial No. 526,843

9 Claims. (Cl. 214—105)

The present invention relates to loading machines and particularly to that type of loading machines known as scraper-loaders wherein a scraper is used in cooperation with a slideway for loading materials into cars, trucks and the like.

Such machines are frequently used in mines and other tunnel constructions where it is of the utmost importance that requirements of head room for accommodation of the machine within a tunnel or the like should be minimized as much as possible. Particularly is this desirable in moving the machine from one locality to another.

For such uses of a loading machine, it is also desirable that the machine should be ruggedly constructed, since it is subjected to considerable abuse and it is also desirable that the machine should be capable of great mobility as to angular range of loading, particularly where the loading machine is designed to run on a track and cannot itself be turned from the course predetermined thereby.

An object of the invention is to provide an improved machine embodying the above mentioned desirable characteristics.

Further objects of the invention are to provide an improved loading machine having a scraper in cooperation with a slideway for loading material, which is characterized by ruggedness of construction and mobility of operation, together with improved means whereby the parts of the machine may be angularly rotated one upon another so as to reduce the total height of the machine and, in consequence, the requirements of headroom in moving the machine from one locality to another.

In accordance with the invention, the above objects are accomplished by providing on a suitable carriage, as a truck, a supporting frame having angular movement in a vertical plane relative to the carriage, so as to permit of angular adjustment movements for raising and lowering the height of the machine; the frame serving to support a suitably constructed slideway, rigidly connected thereto. In this construction, it is an important feature that the supporting frame lies totally beneath the slideway and that it is constructed and connected with the slideway so as to afford ruggedness and stability. Requirements of mobility are satisfied in the present construction by hinging the frame to a second frame which is in turn swiveled to the carriage for rotative movement in a horizontal plane.

As indicated above, there is correlated with the slideway for effecting loading, a scraper which, in loading, is drawn up the slideway by means of suitable power mechanism operating through a winding drum and cables or the like. And it is desirable in machines of this character that the said power mechanism together with related mechanisms should be adequately protected against falling material and other injurious influences regardless of the angle at which the slideway is placed to the supporting structure.

It is a further object of the invention, therefore, to provide an improved organization of the scraper-loader mechanism such that the power mechanism and other related mechanisms will be adequately protected against injury in all angles of adjustment of the loading mechanism thereof to the supporting structure of the machine. At the same time advantages as regards compactness of the assembly and decrease of the head room are produced by mounting the winding drum and associated mechanism beneath the slideway.

It is also desirable in the angular movement of the frame for lowering the total height of the machine, that the required rise of the forward end of the slideway should be only sufficient to insure clearing of the ground during transportation from one locality to another, so that the same may be readily projected into passages of low height while the slideway is in inoperative position without hazarding the jutting of the front end into the ceiling of the tunnel.

A further object of the invention is to provide an improved organization in the mechanism of scraper-loader machines which will require tilting of the slide through only a slight angle as compared with machines of this character heretofore known, for reduction of the total height of the machine.

This latter object is accomplished in accordance with the present invention by providing a slideway projected a considerable distance rearwardly of the pivotal axis of the frame by which it is supported, by bending the front portion of the slideway downward from a point between the said axis and the forward end of the slideway, and so mounting the slideway for angular adjustment that when the front end of the slideway contacts with the ground the rear end will be raised at an angle to the horizontal.

An embodiment of a scraper-loader illustrative of the principles of the invention is shown by the accompanying drawings, in which,—

Fig. 1 shows a scraper-loader in relation to a vehicle to be loaded and to material to be loaded into the vehicle;

Fig. 2 is a plan view of the loader on an enlarged scale as compared with Fig. 1;

Fig. 3 is a view in side elevation of the loader with the slideway in position for loading;

Fig. 4 is a part sectional side elevation with the slideway tilted to inoperative position;

Fig. 5 is a sectional detail on line 5—5 of Fig. 3;

Fig. 6 is a detail of the carriage with the slideway removed;

Fig. 7 is a detailed perspective of a part of the slideway supporting structure.

The machine as illustrated in the foregoing figures comprises a slideway 10 supported for angular adjustment in a vertical plane on a suitable carriage as a truck 11. For co-operation with the slide in loading vehicles, a scraper 12 is provided which is connected with power mechanism 13 by flexible cables 14 and 15, trained about suitable guides as pulleys 16 and 17, at the upper end of the slideway.

The slideway which is preferably in the nature of a long trough-like body, is secured rigidly to spaced upright members 19 and 20 extending respectively from the forward and rear portions of a supporting frame proper 21 which consists of longitudinal members 22 and a transverse member 23, which members may be in the nature of channel irons as shown. The supporting frame proper 21 is designed according to the present embodiment to lie in a horizontal plane when the slideway is in position for loading and is hinged as at 24 to a further frame 25 which rests on the truck 11 and is pivoted thereto for rotation in a horizontal plane. By this arrangement, a universal movement of the slideway is provided for giving great mobility to its operation.

The frame 25 is also comprised of longitudinal pairs of members 26, a transverse member 27 and a bottom plate 27a which rests on turn table 27b. The side members of the supporting frame 21 are spaced so as to receive the frame 25 therebetween; as appears in Fig. 7 which corresponds to the relationship of the frames in Fig. 3. The frames 21 and 25 are respectively provided at their forward ends with transverse channel members 28 and 29 arranged on each frame in pairs spaced apart to accommodate adjusting mechanism 30 for tilting the frame 21 relative to the frame 25. The spaced channel members 28 on the frame 21 are positioned above the side members 22 of this frame so as to rest on the side members 26 of frame 25 when the slideway is in loading position and the arrangement is such that frames 21 and 25 will be in the same plane when channel members 28 are resting in this manner on the said side members 26.

The adjusting mechanism is indicated generally by the numeral 30 and comprises a screw 31 in threaded engagement with a rockable head 32 supported between the channels 29 by side members 26 of frame 25; the screw being journaled in a plate 33 spanning the channel members 28 of frame 21. The turning of the screw 31, for effecting adjustment of the frames relative to each other, may be accomplished through gear connection at 34 by a shaft 35 having a handle 36 at one end, shaft 35 being suitably journaled on the frame 21.

The power mechanism 13 may comprise a motor 37 having a chain drive 37a with a winch or winding drum 38 both of which are mounted on the frame 25. The frame 25, as stated above, is mounted on the truck for angular movement in a horizontal plane on the turn table 27b and is connected with the truck for this purpose by a king pin 39 operating in a suitable bushing 40 on the truck. The winch and motor are mounted on the bottom plate 27a of the frame 25 beneath the slideway so as to turn with the same to all angles of its horizontal adjustment so that they will at all times be protected by the slideway from falling objects and other injurious influences. When mounted in this manner the winch and motor do not contribute to the over all height of the loader and hence do not increase the head room required.

The scraper 12 may be manipulated through cables 14 and 15 which serve to draw the same up or down the slide, as the case may be. To this end the two cables pass respectively over guide pulleys 16 and 17 at the upper end of the slideway and are arranged to wind in opposite directions on the drum 38 so that as one cable is wound upon the drum the other cable is payed out. In consequence of this arrangement, a reversal of the angular movement of the drum will reverse the travel of the scraper cable 15 passing around a pulley 15a suitably positioned relative to the material to be loaded.

The slideway 10 is provided with a flat bottom 41 flanked by side walls 42 and the bottom is provided with a suitable opening 43 near its upper end through which material drawn up the slideway may fall into a suitable conveyance as a car 44. The cables 14 and 15 are preferably protected adjacent this opening by being passed through tubes 45 supported on the under side of the slideway.

It will be noted, by reference to Figs. 3 and 4, that the slideway projects a considerable distance rearwardly of the hinged connection between frames 21 and 25 and that forwardly of this pivotal connection the slideway bends downward toward the ground, at first at a compartively slight angle to clear the trucks, and then more abruptly.

By this arrangement the rear portion of the slideway can be brought into substantial parallelism with the truck on which it is mounted without moving the same through a very great angle and without, therefore, any prolonged manipulation of the screw 30. The total height of the machine may thus be reduced to its minimum and the forward end of the slide sufficiently raised to clear the ground in moving the machine from one locality to another by simple tilting of the frame through a very small angle.

The arrangement of the power mechanism beneath the slideway upon frame 21 insures its protection from injury and the positioning of all supporting structure for the slideway beneath the slideway, as set forth above, avoids obstruction thereby of the passing of the machine when the slideway is in inoperative position as set forth above, without at the same time weakening the supporting structure.

The pulley 16 is positioned on the slideway so that the pull on the scraper will be centrally of the slideway and will, therefore, properly center the scraper relative thereto when the scraper is traveling up the slideway.

Having described my invention, what I claim is:

1. In a machine of the character described, a carriage having an extended load-supporting surface, a frame pivotally carried by the carriage for rotation in a horizontal plane, a second frame pivoted adjacent one end thereof to the first frame for tilting in a vertical plane, a slideway secured to the second frame and tiltable therewith, said second frame being adapted to lie in substantially the same plane with the first-mentioned frame and to distribute its load over the extended surface of said carriage when the slide is in operative position, a scraper, and power means for drawing the scraper up the slideway, said power means being supported on the first frame beneath and so as to be protected by the slideway.

2. In a machine of the character described, a carriage having an extended load-supporting surface, a frame mounted thereon, a slide, a second frame carrying said slide pivotally connected to the first frame, and adapted to be turned about its pivotal connection for tilting the slide in a vertical plane from operative to inoperative position, said second frame being further adapted to lie in substantially the same plane with the first-mentioned frame and to distribute its load over the extended surface of said carriage when the slide is in operative position, and means for turning said second frame about said pivotal connection for tilting said slide in a vertical plane.

3. In a machine of the character described, a carriage having an extended load-supporting surface, a frame rotatable thereon for rotation in a horizontal plane, a slide, a second frame carrying said slide pivotally connected to the first frame, and adapted to be turned about its pivotal connection for tilting the slide in a vertical plane from operative to inoperative position, said second frame being further adapted to lie in substantially the same plane with the first-mentioned frame and to distribute its load over the extended surface of said carriage when the slide is in operative position, and means for turning said second frame about said pivotal connection for tilting said slide in a vertical plane.

4. In a machine of the character described, a slide, a carriage having an extended load-supporting surface, a supporting frame mounted on said carriage for rotation in a horizontal plane and adapted in all of its rotative positions to lie in load-distributing relation to the extended surface of said carriage, a second frame carrying said slide and pivotally connected to said supporting frame, and adapted to be turned about its pivotal connection for tilting the slide in a vertical plane from operative to inoperative position, said second frame being further adapted to lie in substantially the same plane with and to rest upon said supporting frame when the slide is in operative position, and means for tilting said second frame about said pivotal connection.

5. In a scraper-loader, a carriage having an extended load-supporting surface, a frame mounted upon said carriage and pivotally connected thereto to permit rocking of said frame in a vertical plane about said pivot and adapted when in normal or loading position to rest upon and distribute its load over the extended surface of said carriage, a loading slideway extending longitudinally over said frame and movable therewith, and means connected with said frame at a point adjacent the free end thereof for rocking said frame and said associated slideway to non-loading position.

6. In a scraper loader, a carriage having an extended load-supporting surface, power means and winding means supported upon said carriage, a frame mounted upon said carriage and pivotally connected thereto adjacent one of its ends, said frame being adapted when in normal or loading position to rest upon and distribute its load over the extended surface of said carriage, a loading slideway extending longitudinally over said frame and movable therewith, and further extending over said power means and said winding means in protecting relation thereto, and means connected with said frame at a point adjacent the free end thereof for tilting said frame and said associated slideway between the loading and non-loading positions.

7. In a machine of the character described, a loading slideway, a carriage having an extended load-supporting surface, a supporting frame mounted on said carriage for rotation in a horizontal plane and adapted in all of its rotative positions to lie in load-distributing relation to the extended surface of said carriage, power means carried by said supporting frame and movable therewith, a second frame carrying said slideway and pivotally connected to said supporting frame, and adapted to be turned about its pivotal connection for tilting the slide in a vertical plane from operative to inoperative position, said second frame being adapted when in loading position to rest upon said supporting frame, and means for tilting said second frame about said pivotal connection.

8. In a scraper loader, a carriage having an extended load-supporting surface, a supporting frame pivotally mounted upon said carriage for rotation in a horizontal plane and disposed in load-distributing relation to the extended surface of said carriage, power means and winding means carried by and movable with said frame, a second frame pivoted adjacent one end thereof to the first frame for tilting in a vertical plane, a slideway secured to the second frame and tiltable therewith, said second frame being adapted when the slide is in operative or loading position to rest upon and distribute its load over the extended surface of said carriage, said power means and winding means being so positioned on said first mentioned frame as always to be positioned beneath and protected by the slideway carried by said second frame, and means connecting with said second frame at a point adjacent the free end thereof for tilting said frame and said associated slideway between the loading and non-loading positions.

9. In a scraper loader, a carriage having extended load-supporting surfaces, a platform pivotally mounted upon said carriage for rotation in a horizontal plane and having extended load-supporting portions adapted in all relative positions of the carriage and of said platform to rest upon said load-supporting surfaces of said carriage, a loading slideway extending longitudinally over said platform and mounted for rocking movement with respect to said platform in a vertical plane about a pivot adjacent the load-discharging end of said loader, power means and winding means mounted upon said platform beneath said loading slideway, and a screw device mounted upon said platform adjacent the load-receiving end of said slideway for controlling the rocking of said slideway.

LAMAR WEAVER.